United States Patent [19]

Allen

[11] 3,788,659
[45] Jan. 29, 1974

[54] HAND TRUCK
[76] Inventor: Benigene Allen, 3291 Oakwood St., Portage, Ind. 46368
[22] Filed: June 5, 1972
[21] Appl. No.: 259,585

[52] U.S. Cl............ 280/5.24, 280/36 C, 280/47.27
[51] Int. Cl............................................. B62b 5/02
[58] Field of Search...280/36 C, 38, 39, 47.27, 280/47.28, 47.12, 5.24

[56] References Cited
UNITED STATES PATENTS
| 3,659,867 | 5/1972 | Curry | 280/36 C |
| 2,710,195 | 6/1955 | Kurth | 280/5.24 |
| 2,490,189 | 12/1949 | Alexander | 280/36 C |
| 2,806,708 | 9/1957 | Finstad | 280/36 C |

FOREIGN PATENTS OR APPLICATIONS
| 829,858 | 1/1952 | Germany | 280/39 |

Primary Examiner—Robert R. Song

[57] ABSTRACT

The structure is directed to a manually operable truck comprising a pair of wheel units, a lower forwardly extending load-bearing platform, an upright load-bearing framework provided with a handle whereby to facilitate manipulation of the truck; and the invention primarily involves providing means whereby the aforesaid components may be adjusted for operational use or to a folded or collapsed condition for storage or shipment.

12 Claims, 12 Drawing Figures

PATENTED JAN 29 1974
3,788,659
SHEET 1 OF 2
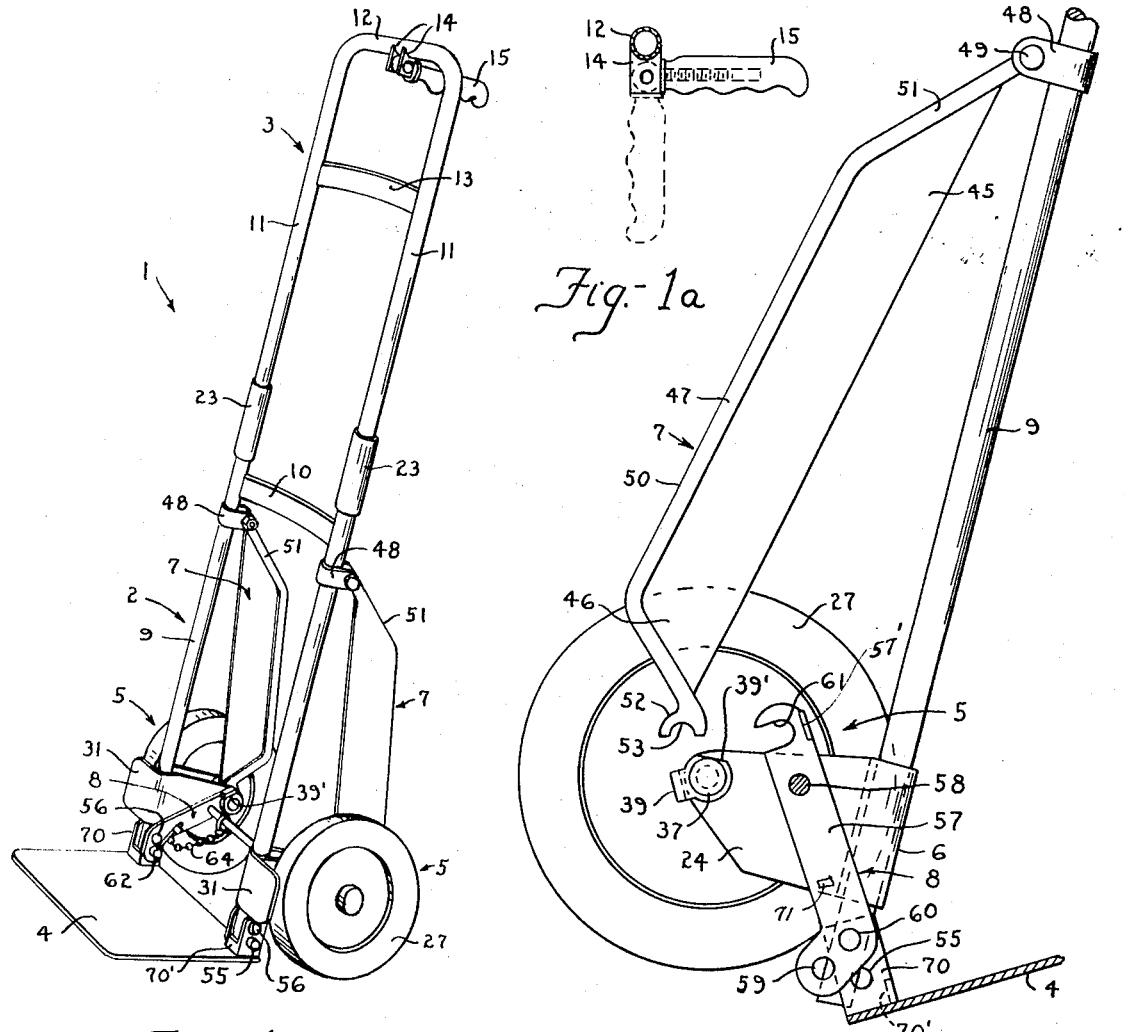
Fig.-1a
Fig.-1
Fig.-3
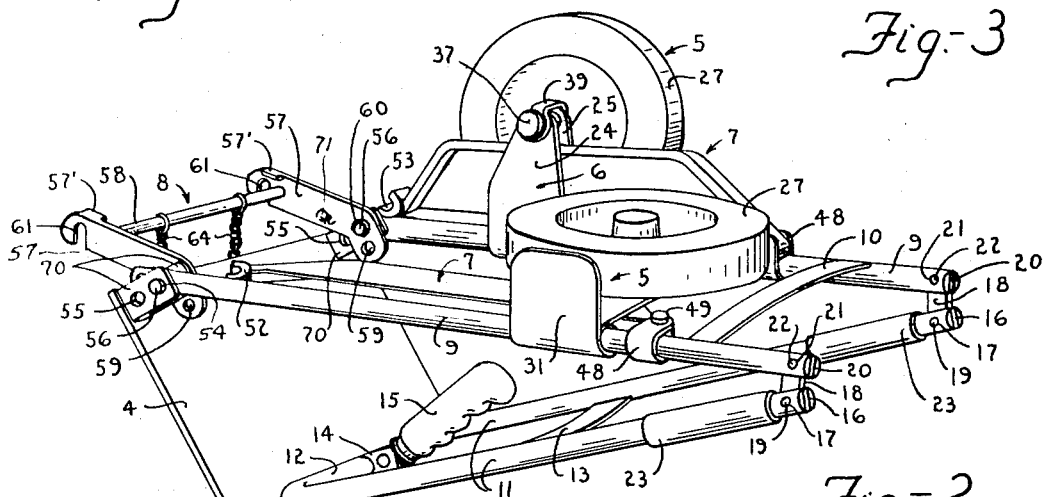
Fig.-2

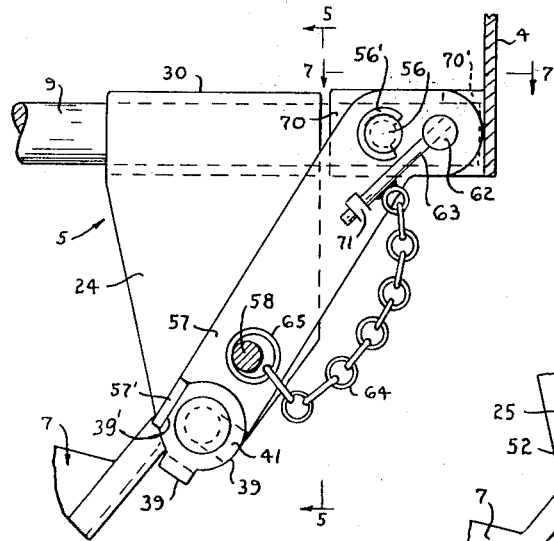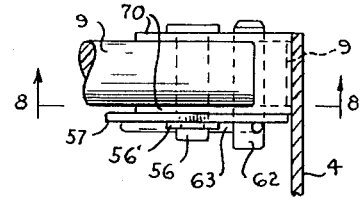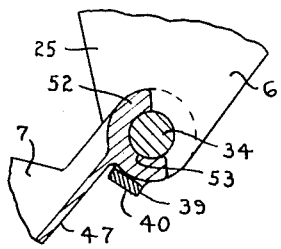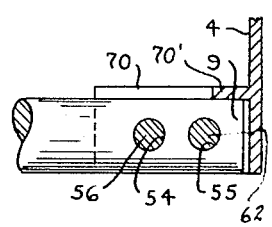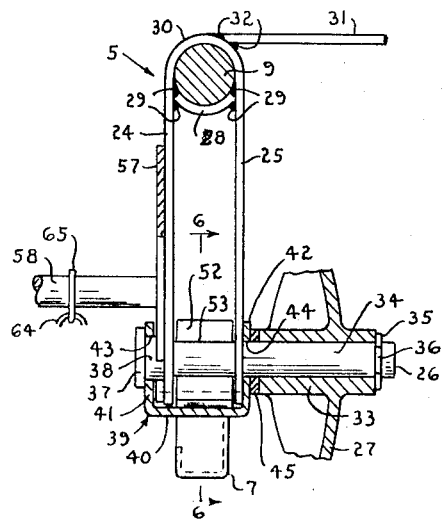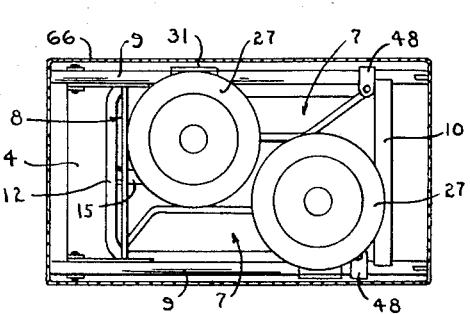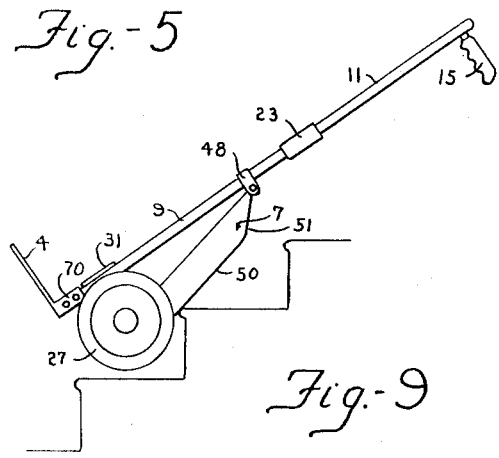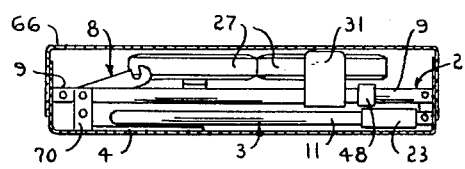

HAND TRUCK

The subject invention is directed to means whereby to facilitate carrying a load from one place to another and more particularly to a manually operable truck, which, among other things, comprises an elongated upstanding primary or lower frame or section, a pair of wheel units operatively connected to a lower extremity of the frame, a load-bearing forwardly extending platform carried by the lower extremity of the frame, and a secondary or upper frame or section provided with handle means whereby to facilitate manual operation of the truck. Each of the wheel units preferably comprises a wheel and support means for attaching the units to the primary frame.

One of the principal objectives of the invention is to provide a truck in which each of the frames or sections, above referred to, includes a pair of parallel side members which are adjustably connected at their inner extremities so that the sections may be secured in alignment to provide a framework for operational use or may be folded to a collapsed or imperative condition.

An important object of the invention is to provide means embodying improved principles of design and construction for pivotally and slidably connecting the wheel units on the side members of the primary frame so that the wheel units may be locked in parallel operative positions transverse to the frame for use or in a folded offset relationship in a plane substantially parallel to the frame.

A specific object of the invention is to provide the truck with angularly disposed means preferably in the form of struts which assist in locating the wheel units in their respective operative positions and provide levers whereby to facilitate manipulating the truck up or down a stairway. In other words, the struts offer a setup whereby the truck may be manipulated up or down steps in order to promote the leverage factor and facilitate disposition of the wheels for movement on the steps.

A significant object of the invention is to provide the primary frame with locking means whereby to facilitate locking of the load-bearing platform and wheel units in their respective operating positions for use and/or allow the wheel units, platform, struts and locking means to be folded or adjusted to collapsed conditions.

Another object of the invention is to provide the locking means, above referred to, with a cross-bar or rest, which may be engaged by the foot of an operator whereby to assist in manual operation of the truck, particularly for placing the load-bearing platform underneath the load and for stabilizing the wheels while breaking the load backward for travel position.

A specific object of the invention is to provide the side members of the primary frame with guards for the wheels.

Another important object of the invention is to provide a truck of the character described above, in which all of the components remain substantially connected, and this affords a setup whereby there can be no accidental loss of parts during any of the adjustments required to connect the components in their respective operative or inoperative positions. Otherwise expressed, the truck is completely assembled whether adjusted or unfolded for use or is adjusted or folded to assume a minium of space in a carton for shipment and/or storage.

Additional objects and advantages of the invention will readily become apparent after the description hereafter set forth is considered in conjunction with the drawings annexed hereto.

In the drawings:

FIG. 1 is a perspective view showing the components of the truck assembled in their respective operative positions for use; FIG. 1a is a view of a handle in an operation carried by a secondary frame of the truck;

FIG. 2 is a perspective view showing the truck in FIG. 1, in a partially collapsed or folded condition;

FIG. 3 is an elevational side view showing the relative positions of certain of the components whereby to illustrate their modes of connection and disconnection;

FIG. 4 is a transverse section taken through a lower part of the truck for the purpose of illustrating utilization of the locking means above referred to;

FIG. 5 is a section taken substantially on line 5—5 of FIG. 4 illustrating details with respect to the wheel units;

FIG. 6 is a partial section taken substantially on line 6—6 of FIG. 5 and illustrates additional details with respect to stabilizing the wheel units;

FIG. 7 is a section taken substantially on line 7—7 of FIG. 4 and illustrates certain details of the connections between the load-bearing platform and the primary frame or section;

FIG. 8 is a section taken substantially on line 8—8 of FIG. 7, and illustrates details with respect to mounting the load-bearing platform;

FIG. 9 is a side elevational view, on a smaller scale, showing the manner in which the truck may be employed in carrying a load up or down steps;

FIG. 10 is a top view showing the truck in a folded or collapsed condition in a box or carton for shipment; and FIG. 11 is a sectional side view of the structure in FIG. 10.

The truck may be designed and constructed in various ways, but as exemplified, for example, in FIG. 1 of the drawings, comprises, among other things, an upstanding structure or framework generally designated 1, which includes a primary frame generally designated 2 and a secondary frame or section generally designated 3, a lower load-bearing platform 4, which extends forwardly of the primary or lower frame, a pair of wheel units generally designated 5, which includes mounting or support means 6 therfor, a pair of struts generally designated 7, which are carried by the primary frame for detachable engagement with the support means 6, and a locking means generally designated 8, which may be utilized to lock the wheel units 5 and load-bearing platform 4 in their respective operative positions with respect to the primary frame 2 or which may be adjusted whereby they may be moved to inoperative or folded conditions as shown, for example, in FIGS. 10 and 11, all of which will be described more in detail subsequently.

The primary and secondary frames 2 and 3 may be designed and constructed as desired but the majority of the components are preferably constructed from cylindrical solid rod stock. The primary frame includes a pair of parallel side members 9 joined together of their upper extremities by a curved bridge 10 and the secondary frame 3 is preferably arch-shaped and includes a pair of parallel side members 11 which are joined at their upper extremities by a cross or handle portion 12 and by an intermediate curved metal bridge 13 having ends preferably welded to the side members 11. The inner side of the cross portion 12 is preferably provided with a pair of corresponding inturned apertured parallel lugs 14. A T-bolt (not shown in detail) has short ends extending into the apertures in the lugs whereby to pivotally connect the bolt to the lugs, and also has a threaded stem which carries an internally threaded handle 15. This organization allows the handle 15 to be moved to a collapsed condition between the side members 11 of the secondary frame 3 as depicted by the dotted lines in FIG. 1a or to a desirable laterally extended transverse position shown in FIGS. 1 and 1a so that an inner extremity of the handle may be moved against certain portions of the lugs to an operative position for leverage purposes to facilitate manipulation of the truck or may be rotated on the stem to release it from the operative position to an inoperative position between the side members 11 where it may be temporarily held by rotating it against other portions of the lugs. The secondary frame is thus provided with a pair of handles 12 and 15 and either or both may be employed.

The lower ends of the side members 11 of the secondary frame, as depicted in FIG. 2, are preferably slotted longitudinally as indicated at 16 and provided with aligned transverse apertures 17 so that apertured ends of a pair of planar links 18 may be respectively secured in the slots 16 by means of pivots 19, which extend through all of such apertures. The upper ends of the side members 9 of the primary frame are similarly provided with slots 20 for accommodating apertured opposite ends of the links and with aligned apertures 21 so that pivots 22 may be extended through these apertures for pivotally connecting the links to the side members 9. With this unique setup, the frame or sections may be adjusted to substantially collapsed or folded conditions, as depicted in FIGS. 10 and 11, or may be locked in operative alignment, as depicted in FIG. 1, by manually sliding downwardly a pair of sleeves 23 respectively carried by the side members 11 into an embracing or telescoping frictional relationship with the upper ends of the side members 9. The links afford adjustment of the frames to an aligned or extended relationship and the sleeves serve to lock the frames in such relationship as well as facilitate adjustment of the frames in an offset substantially parallel folded or collapsed relationship.

The wheel units 5, above referred to, may be designed and constructed in various ways but as exemplified in FIGS. 1 through 6 and particularly in FIG. 5, each unit preferably includes the support means 6, which is generally U-shaped and comprises a pair of tapered parallel side walls 24 and 25 having aligned apertures therein through which a shaft 26 extends for supporting a wheel 27. The side walls of each support means are preferably permanently joined together intermediate their lengths by an elongated concave member 28, having parallel side edges, which are preferably welded at 29 to the inner surfaces of the side walls. The curvature of each member preferably corresponds to that of an outer curved junction portion 30 of each support means so that the latter and the member serve to provide a tubular formation or bearing means, which may slidably and rotatably receive one of the side members 9 of the primary frame 2. Guards in the form of plates 31 are preferably respectively transversely anchored by welding 32 to the junctions 30 of the support means for protecting the wheels. Each wheel is provided with a hub 33, which rotatably receives the cylindrical portion 34 of a shaft, and each wheel is detachably secured to a shaft by means of a suitable locking element, such as a resiliently flexible washer 35 having a slot, which is adapted to detachably receive a reduced or neck portion 36 provided on the outer end of a shaft. The inner end of each shaft is provided with a head 37 and an adjacent cylindrical enlargement 38. A U-shaped receiving means 39 is pivotally carried by each shaft and each receiving means includes a bridge portion 40 and a pair of parallel side portions 41 and 42, the latter of which are respectively provided aligned apertures 43 and 44. The aperture 43 is of a diameter to receive the enlargement 38 of a shaft and the other aperture 44 is of a smaller diameter to receive the cylindrical portion 34 of a shaft. It will be observed that the side portion 42 of each receiving means is located between a side wall 25 and the hub 33 of a wheel and that the other side portion 41 of the receiving means is located between the head 37 of a shaft and the other side wall 24 of a support means. It should be observed that the side portions of each receiving means 39 are preferably enlarged in order to stabilize the position of the receiving means, the latter of which is pivoted for the purpose of accommodating and latching or holding a lower extremity of a strut as depicted in FIGS. 4, 5, and 6. It should be noted that each enlargement is preferably provided with chordal edge 39' as shown in FIG. 3 for a purpose which will be described subsequently.

Referring more particularly to the structure of the struts 7, as depicted in FIGS. 3, 5, and 6, the major portion of each is preferably of a substantially uniform thickness and width and has upper and lower tapered extremities 45 and 46 and a lateral flange 47 extending throughout its length. The upper extremity 45 of each strut is preferably connected adjacent to an upper end of a side member 9 of the primary frame 2 by a clevis or clamp 48, which is disposed about and carried by the side member. Each clevis is preferably pivotally and slidably connected to a side member. The upper extremity 45 is pivotally connected between offsets on each clevis by a pivot 49, which extends through apertures provided in the offsets and an aperture provided in the extremity. It is to be observed that the flange 47 of each strut also serves to impart rigidity to the strut and also serves to provide a relatively long straight runner 50 and that a portion of the flange on the upper extremity of each strut provides a shorter runner 51, which is disposed angularly with respect to the runner 50 and constitutes a continuation thereof.

The lower extremity 46 of each strut is preferably formed to provide an offset 52 having a semi-cylindrical bearing surface 53, which is adapted to engage the cylindrical portion 34 of the shaft 26 when the offset is manually inserted into a receiving means 39 and between the side walls 24 and 25 of a support means as shown in FIGS. 5 and 6. The receiving means and side walls of the support means serve to stabilize the positions of the lower extremities 46 of the struts when they engage the shafts 26, and the locking means 8, above referred to, serves to detachably lock the struts in place so as to locate the wheel units 5 in their respective operative positions for use.

The runners 50 and 51 serve as levers whereby to facilitate manipulation of the truck up or down steps as exemplified in FIG. 9. More particularly, the struts serve as climbers, which function to lessen the physical effort of hauling loads up or down stairs, by momentarily absorbing the load from the wheels and placing it on the next step in the direction of travel. The struts are unique as to structure and operative relation with respect to the primary frame and other components due to the fact that they may be readily adjusted or folded for storage or unfolded without being removed from the truck.

As alluded to above, the truck is provided with a lower forwardly extending load-bearing platform 4. The platform may be designed and constructed in various ways and is adapted to be adjusted to the substantially forward operative positions illustrated in FIGS. 1 and 9 or to a collapsed or folded condition as illustrated, for example in FIG. 11. More specifically, the inner corners of the platform are preferably respectively provided with pairs of upstanding parallel lugs 70 and each pair of lugs is provided with an upper pair of aligned apertures 54 and a lower pair of aligned apertures 55 and fastening means preferably in the form of a pivot 56 extends through each pair of upper apertures and through openings provided therefor in the lower ends of the side members 9 of the primary frame so that the platform may be pivotally adjusted with respect to this fame.

The locking means 8, as alluded to above, may be utilized to simultaneously lock the wheel units, struts, and platform in their respective operative positions or to unlock the same to facilitate manual folding or collapsing them to the inoperative or collapsed positions or conditions as shown in FIGS. 10 and 11.

More particularly, the locking means may be designed and constructed in various ways but as illustrated, preferably includes a pair of parallel elongated side links 57, which are connected adjacent their upper extremities by a transverse cross-bar or footrest 58 and the lower extremities of the links are preferably offset and respectively provided with lower openings 59 and upper openings 60 as shown in FIG. 3. The pivots 56, above referred to, respectively extend through the upper openings 60 and serve to pivotally connect the locking means to the lower extremity of the primary frame as well as the platform relative to this frame. These pivots may be locked in place by resiliently flexible fasteners 56', which engage grooves in the pivots. The upper ends of the links 57 of the locking means are preferably notched as indicated at 61 so that when the lower offsets 52 of the struts 7 are engaged with the shafts 26, the locking means 8 may be pivoted so that the notches 61 will receive the enlargements 38 on the shafts, after which a pair of locking elements, preferably in the form of pins 62, may be respectively inserted through the lower openings 59 in the links through the lower apertures 55 in the lugs 70 on the platform for locking the locking means in place, including the struts and platform. It will be evident that the locking means also assist in maintaining the wheel units in a predetermined parallel relation and a pair of inturned abutments 70' on the platform against the lower ends of the side members 9 as depicted in FIG. 4 to assist in stabilizing the platform. Th links 57 are also provided with inturned lugs 57', which serve as abutments, which are adapted to engage the abutments 39' on the receiving means 39 for locking the latter in position to keep the lower ends of the struts connected with the support means 6. Thus, the receiving means constitute what might be referred to as secondary locking means, which are locked in place through the agency of the locking means 8, which may be referred to as a primary locking means.

Each of the locking elements 62 is preferably provided with a stem 63, and one end of a chain 64 is connected to the stem 63 and its other end is provided with a ring 65 through which the cross-bar 58 extends for permanently connecting the element to the locking means and facilitating manipulation of the element. Any means suitable for the purpose may be employed for retaining the elements in their respective locked positions. More particularly in this respect, the links 57 of the locking means may be provided with resiliently flexible fasteners 71, which serve to detachably hold the stems 63 in relation to the links 57 and thereby prevent release of the elements.

It is to be understood that the sizes and shapes of the components may be modified to make the truck more suitable for special applications without varying its basic folding features. Also, any material, such as steel, stainless steel, aluminum, and the like, whether extruded, welded, forged, or cast, may be employed wherever desired. Certain of the components may be also relocated or slightly modified without materially varying the overall identity of the structure.

In view of the foregoing, it should be manifest that the various components may be adjusted to provide a truck which offers advantages with respect to adjustability of foldability for packaging in a container 66, storage, or transport purposes, in which primary and secondary frames may assume a substantially parallel relation with the wheels disposed in an offset relation in a plane substantially parallel to the frames and that the platform may be folded to a collapsed condition so that it is disposed in a plane below the plane of the secondary frame and so that the locking means 8 may be disposed substantially between the side members of the primary frame. It should also be further manifest that the aforesaid components may be readily adjusted so that they assume their respective operative positions as exemplified in FIG. 1 of the drawings.

Having thus described my invention, it is obvious that various modifications may be made in the same without departing from the spirit of the invention; and therefore, I do not wish to be understood as limiting myself to the exact forms, construction, arrangements, and combinations of parts herein shown and described.

I claim:

1. A truck of the character described comprising: a frame having a pair of elongated substantially parallel side members, a pair of wheels, and a pair of support means having inner portions which are respectively pivotally and slidably connected to said side members, said support means also having outer portions which respectively carry said wheels, a pair of struts having outer ends respectively connected to said side members and inner ends for respectively engaging said pair of support means, and locking means adjustable on said side members for detachably locking the inner ends of said struts in engagement with said support means for maintaining said wheels in substantially operative positions for use.

2. The truck defined in claim 1, including a platform pivotally connected to the lower ends of said side members, and said locking means also serves to lock said platform in a forwardly extended operative position for use.

3. The truck defined in claim 1, including an arch-shaped frame having side members, and means for adjustably connecting these side members to the side members of said first-mentioned frame whereby to provide a continuation of the latter.

4. The truck defined in claim 1, including a platform which is pivotally connected to a lower extremity of said frame, said locking means may be utilized to lock said platform in a predetermined forwardly extended operative position for use, and an additional frame is adjustably connected to said first-mentioned frame whereby to constitute a continuation of the latter.

5. The truck defined in claim 1, in which the outer ends of said struts are pivotally connected to the side members and said locking means also serves to allow said support means and wheels carried thereby and struts to be adjusted to collapsed conditions, in which the wheels are located substantially parallel to the plane of the frame.

6. The truck defined in claim 1, in which said struts are provided with fixed runners for leverage purposes.

7. A truck of the character described comprising: a primary frame having a pair of elongated parallel side members and a secondary frame, means whereby one of said frames may be secured in an extended position to constitute a continuation of the other of said frames or to a substantially collapsed condition, a pair of wheels, a pair of support means having inner portions which are respectively pivotally and slidably connected to said side members, said support means also having outer portions which respectively carry said wheels, a pair of struts having outer ends adjustably connected to said primary frame and inner ends which are respectively engageble with said support means, a platform pivotally connected to said primary frame, and movable locking means whereby the inner ends of said struts may be locked in engagement with said support means to locate said wheels for use and said platform is locked in a forwardly extended operating position relative to said primary frame for use, said locking means also affording a setup whereby said wheels and support means as units and said struts may be adjusted to collapsed conditions whereby said wheels are located in a longitudinal relationship in a plane substantially parallel to the plane of said primary frame, and said platform may be moved to an inoperative position in a plane substantially parallel to said primary frame.

8. The truck defined in claim 7, whereby when said units, struts, platform, and secondary frame are collapsed the latter is located between said primary frame and said platform.

9. The truck defined in claim 7, whereby when said units, struts, platform, and said secondary frame are collapsed the latter is located between said primary frame and said platform, and said locking means may be moved so that portions thereof may be located between said struts and portions of said primary frame.

10. A truck of the character described comprising: a frame having a pair of elongated substantially parallel side members, a pair of support means having inner portions respectively pivotally and slidably connected to said side members said support means also having outer portions, wheels respectively mounted on outer portions, a pair of struts having outer ends respectively pivotally and slidably connected to said side member and inner ends respectively engaging said pair of support means and means carried by said support means for locking said inner ends of said struts to said support means.

11. The truck defined in claim 10, including a platform carried by said side members at a location below said support means, and second locking means pivotally connected to said side members for locking said first-mentioned locking means in place, and means for locking said second-mentioned locking means and said platform in locked relation to said side members.

12. The truck defined in claim 10, including a second frame having an arch and side members connected to the side members of said first-mentioned frame, a pair of apertured lugs carried by said arch, a fitting having ends journaled in the apertures of said lugs and an externally threaded shank, and an internally threaded handle carried by said shank, said handle being manually operable whereby the same may be caused to engage certain portions of said lugs for maintaining said handle in outwardly extended position for use or may be caused to engage other portions of the lugs for locking the handle substantially between said side members of said second frame for nonuse.

* * * * *